US007421329B2

(12) United States Patent
Bowling et al.

(10) Patent No.: US 7,421,329 B2
(45) Date of Patent: Sep. 2, 2008

(54) SIMPLE ENGINE FUEL CONTROLLER

(75) Inventors: Bruce Alan Bowling, Havre de Grace, MD (US); Albert Carlos Grippo, Virginia Beach, VA (US)

(73) Assignee: BG Soflex, LLC, Virginia Beach, VA (US)

( * ) Notice: Subject to any disclaimer, the term of this patent is extended or adjusted under 35 U.S.C. 154(b) by 0 days.

(21) Appl. No.: 11/703,827

(22) Filed: Feb. 8, 2007

(65) Prior Publication Data

US 2007/0282516 A1 Dec. 6, 2007

Related U.S. Application Data

(63) Continuation of application No. 10/375,458, filed on Feb. 27, 2003, now Pat. No. 7,313,474.

(60) Provisional application No. 60/362,475, filed on Mar. 7, 2002.

(51) Int. Cl.
*G06F 19/00* (2006.01)

(52) U.S. Cl. ...................................... 701/102; 701/109

(58) Field of Classification Search ....................... None
See application file for complete search history.

(56) References Cited

U.S. PATENT DOCUMENTS

| | | | | |
|---|---|---|---|---|
| 4,452,210 | A | 6/1984 | Sasayama et al. | |
| 5,331,937 | A * | 7/1994 | Clarke | 123/491 |
| 5,913,911 | A | 6/1999 | Beck et al. | |
| 6,102,019 | A | 8/2000 | Brooks | |
| 6,138,638 | A * | 10/2000 | Morikawa | 123/295 |
| 6,161,530 | A | 12/2000 | Kakizaki et al. | |
| 6,687,597 | B2 | 2/2004 | Sulatisky et al. | |

* cited by examiner

*Primary Examiner*—Willis R. Wolfe, Jr.
*Assistant Examiner*—Johnny H. Hoang
(74) *Attorney, Agent, or Firm*—Sughrue Mion, PLLC

(57) ABSTRACT

An electronic engine fuel controller that is simple, low cost, easily installed, and configurable for any internal combustion engine. The system is intended for upgrading older carbureted vehicles or vehicles that have been modified beyond the limits of the OEM controller. It takes advantage of modern micro controller technology with integrated memory, digital input/output, sensor and timer channels to produce a low parts count, as well as reliable operation in a large variety of vehicles, even when installed by people with little experience of knowledge in this area. Operation is by sensing a tachometer signal from the existing distributor, ignition coil, toothed wheel or similar device that produces one electronic pulse for each cylinder cycle. When a pulse is received, software in the micro measures engine operating parameters, calculates fuel parameters, and fires one or more injectors depending on how the system is configured. Configuration software operating on an external computer or laptop and communicating with the micro allows the user to modify any of the controller parameters or tables used for the fuel calculations.

43 Claims, 14 Drawing Sheets

FIG. 5B

ORDERED TABLE SEARCH
  ROUTINE
LINEAR INTERPOLATION
  ROUTINE
32X16 UNSIGNED MULTIPLY
FLASH PROGRAMMING ROUTINE

UTILITY SUBROUTINES

RECEIVE SERIAL COMM BYTE
IF 'A':
  ENABLE TRANSMIT OF
  DISPLAY DATA
IF 'B':
  BURN PRESENT USER
  DATA IN FLASH
IF 'C':
  ENABLE TRANSMIT OF
  SECONDS DATA
IF 'V':
  ENABLE TRANSMIT OF
  VOLUMETRIC EFFICIENCY
  TABLE DATA
IF 'W':
  RECEIVE OFFSET AND
  NEW BYTE OF USER
  INPUT DATA

SERIAL RECEIVE
INTERRUPT ROUTINE

TRANSFER BYTE TO TRANS-
  MIT REGISTER
IF LAST BYTE SENT, DISABLE
  TRANSMIT MODE

SERIAL TRANSMIT
INTERRUPT ROUTINE

FIG. 6A

S1138128A600B705A630B703A6F0B7073F00A6FF19
S1138138B704A600B702A61FB706A601B70C6E328D
S11381482B6E002E6EB82F6E10306E00316E00321A
S11381586E522B6E32206E00236E64246E10256ED0
S113816810286E00264EF5276E00294EF52AA61211
S1138178B7191C1314141A14B6163F713F726E04FF
S11381881D3F663F673F683F403F69A6FF3F41A6E2
S113819832B74E3F423F5C3F5E3F4DA600B756B7ED
S11381A84E3F573F58A6FFB7763F6BA6BBB743B7BA
S11381B844B745B746B747B748A664B74BB752B7AD
S11381C850B74CB74AB7703F51A646B744A665B7EF
S11381D8433F4F3F6DA670B73EA600B73C0F3CFD2A
S11381E8B63DB7433F759A8C5FD6E000E7965C517D
S11381F8800220F58C5FD689B8D701165C51FF023E
S113820820F4C6010D2714B74EB75910003F573F45
S11382185814411041184112411042BCC6010AA455
S113822801261DB64397D6F100B750B64497D6F346
S113823800B75AC6010CA5082621A664B750201B0E
S1138248B64397D6F200B750B64497D6F400B75A57
S1138258C6010CA5082604A664B750B64697D6F5F9
S113826800B75BB64597D6F600B74BC6010FB15BAE
S11382782204130020021200014 2A0555C279C8BA3
S1138288864D27113F773F78357B55F83579CD8969
S11382982CB67A2007B6F8878AB6F952B74DA103E7
S11382A8222D124215421742A69BB1472207A60364
S11382B8B756CC8223A600B783A6CDB7844ED685FD
S11382C84ED7864E5B87CD88DA4E8856CC822303F8
S11382D842081342144216423F6C45E0803583A697
S11382E809B785B65BB786CD88BD8CB68797E6DABD
S11382F8B7865AE6DAB7854E5B87CD88DA4E884C5E
S1138308B64CA164260CA664B74C15421742150254
S11383182027140205422 2B66CB1D922183F834E95
S1138328D9844ED8853F864E6C87CD88DAB688BB0B
S11383384CB74C2004154220009B4E47834E76844C
S11383489AB683B184257CB683B084B1E9257208D2
S11383584215B6E4B74F3F6AB6EAB76F18421B42F4
S113836812021502CC8447A600B783A6CDB7844E63
S1138378E8856E00864E5B87CD88DA4E888FA60026
S1138388B783A6CDB784C60111B7856E64864E5BE4
S113839887CD88DA4E889045E08A3583A603B78569
S11383A8B647B076B786B78CCD88BD8CB68797E6C6
S11383B8E4B7865AE6E4B785B68CB787CD88DA2061

FIG. 6B

S11383C804202D2042B68897B69042898AAE64521A
S11383D8250E878B86A1329304864C2007862004B9
S11383E8A6C82000BB8FB788B14F2504B688B74FFD
S11383F80A4206B66AB16F25461942A664B7703FA9
S11384084F13021B422038B684B083B1E9252309EF
S1138418420EA664B7703F4F194213021B42201F35
S1138428B64DA10F2519B6EBB7701A4219421302BB
S1138438200D0B420A1B42A664B7703F4F2000B6BA
S1138448EE2770B64DC1010E25690842660A4263DB
S1138458B65BB1EC255DB647A1B22257B6692606CC
S1138468B640A11E254DB66BB1ED254D3F6BC60137
S11384780CA5022609B649C1011025212009B649CF
S1138488C1011025022016A664B0EFB784B64AB01D
S1138498EEB783B1842522B683B74A201CA664BBF1
S11384A8EFB784B64ABBEEB783B184220CB683B760
S11384B84A2006A664B74A2000C6010CA50427046E
S11384C8B647B75A45E06C3583A607B785B65AB799
S11384D886CD88BDB683B6844E878A4E838B4E84F8
S11384E88C45E0643583A607B785B64DB786CD8835
S11384F8BD4E878D4E838F4E84908CA6088788B690
S11385088A4A42BB8D4A97E696B7915CE696B7923B
S1138518A6088788B68A42BB8D4A97E696B7935CC5
S1138528E696B794CC852F4E8F834E90844E9185D2
S11385384E92864E4D87CD88DA4E88954E8F834E5F
S113854890844E93854E94864E4D87CD88DA4E8816
S11385588D4E8B834E8C844E95854E8D864E5A87D0
S1138568B65ACD88DA4E8852B64C97B67042898A84
S1138578AE64522555878B86A1329304864C20011C
S11385888697B64B42898AAE6452253E878B86A16C
S1138598329304864C20018697B64A42898AAE648F
S11385A8522527878B86A1329304864C200186970F
S11385B8B65042898AAE64522510878B86A13293BD
S11385C804864C200186B7512004A6F1B75197B60A
S11385D85242898AAE64522510878B86A13293044D
S11385E8864C200186B7832004A6F2B78397C60178
S11385F80CA5042604B65A2002A66442898AAE64ED
S113860852251487 8BA632B78486B1849304864C8A
S1138618200186B7832004A664B78397B6F04289FD
S11386288AAE64522510878B86A1329304864C2027
S113863801 86B78D2004A6FEB78DA63DB783A6A4F0
S1138648B784B6F3BBF7B785B6F3B0F7B7862A0293
S11386583F864E4887CD88DAB68DBB88250BBB4F3D

FIG. 6C

S11386682507B0F4B756CC8675A6FEB756CC822338
S11386783C6604410C08411B06412A0A4155CC8733
S1138688091641154110411002 6E00264EF52719AE
S11386980320E21A41194112411002 6E00294EF5D5
S11386A82A1B0320D33C57B657B14E2708B657B1F7
S11386B8F6271520C6174115411141180 36E3220BB
S11386C86E10256E022020B36E32206E1E256E02B7
S11386D82020A83C58B658B1592708B658B1F627EF
S11386E815201E1B4119411341 1A036E32206E10C6
S11386F8286E0220200B6E32206E1E286E02202067
S11387080001423506410 50A41021102B65D44B131
S11387185F2604141D131D3C5F26203C5EB65EA133
S11387286426183F42110019003F5E3F5F1102158D
S1138738023F4E3F4D131D2002131DB666A10A26A3
S1138748283C673F66B675AA40B73CB667A164265D
S1138758183C683C6A3F67B647B776B668A10A26EC
S1138768083F683C4026023C69B62B1F2B803C6CB2
S11387783C6BB65EB75CB65FB75D3F5E3F5F1000AB
S1138788104202421 23C6DB66DB1F1270AB66DA1D2
S1138798082640 3F6D203C100010423F6D024221E4
S11387A8B6F2271D3C6E006E0CB656B74E3F5714F2
S11387B8411041201EB656B7593F5818411241205E
S11387C812B656B74EB7593F57144110413F58187F
S11387D8411241141D121D161D808B8CB67597E627
S11387E844E760B63DE94446E744B6754CA106261D
S11387F8014FB7758A808BB616B673A105276DA18C
S113880806277 0B618A1412716A1422722A143279B
S113881825A1562731A157273DA151273F20603F65
S113882871A601B773A617B77216141E142050CD7B
S113883801163F7320493F71A601B773A602B772A8
S113884816141E1420393F71A603B773A67EB77297
S113885816141E142029A605B77320233F71A605F4
S1138868B773A602B77216141E1420134E18743C5C
S113887873200C8CB67497B618E7963F7320008A59
S1138888808BB6168CB67197B673A105270CA10117
S11388982604E6402007E6962003D6E08EB718B6ED
S11388A8714CB771B172260A3F713F723F73171446
S11388B81F148A80803F875583F6B783B7845C3C4E
S11388C8874E8483F6B784B1862206B687B1852697
S11388D8ED813F894E8588B687B18322022044B64C
S11388E887B18425054E868820394E8588B684B09C
S11388F883273087B686B0852403403C8987B687AA

FIG. 6D

S1138908B083271D8842898A885287B689260786B4
S1138918BB85B788200D86B789B685B089B7882006
S113892802868681 8B8789A7FDA6209EE703B67BEE
S11389389EE701B67C9EE7024E7A7C4E797B4E78A0
S11389487A4E77793F773F78B67749397C397B39DE
S11389587A397939783977B6789EE002B778B67774
S11389689EE201B777B67CA200B77C017C16B67884
S11389789EEB02B778B6779EE901B777B67CA90073
S1138988B77C2002107C9E6B03BEB6779EE701B6C7
S1138998789EE7024E79774E7A784E7B794E7C7AC8
S11389A89EE601B77B9EE602B77CA70388868A8188
S11389B845FE08A602F7C6FF7EC7E000A60CAD1F59
S11389C8A60AF7A6F0AD18AD16AD14AD12AD10A6F3
S11389D808F7A606AD09A600F7A602AD0220044AC8
S11389E826FD81A601F7C6FF7EC7E000A60CAD2CC4
S11389F8A609F7A606AD258C5FE696D7E000A62261
S1138A08AD1A5CA340270220F045FE08A608F7A685
S1138A1806AD09A600F7A601AD0220044A26FD8189
S1138A28A601F7C6FF7EC7E040A60CAD2BA609F742
S1138A38A606AD248C5FE6D6D7E040A622AD195C25
S1138A48A340270220F045FE08A608F7A606AD08AD
S10F8A58A600F7A601AD01814A26FD81AD
S113FAC31201018128FB00CC88BCCC87E2CC88BC22
S113FAD3CC8889CC87FECC88BCCC88BCCC88BCCCF5
S113FAE38678CC88BCCC88BCCC88BCCC88BCCC887D
S110FAF3BCCC88BCCC8776CC88BCCC8128E8
S113F100648D8D8D8D8C8C8C8C8B8B8B8B8A65
S113F1108A8A8A8A898989898988888888878760
S113F120878787868686868585858584848483
S113F130848483838383828282828181818181A8
S113F14080808080807F7F7F7F7E7E7E7E7E7DCD
S113F1507D7D7D7D7C7C7C7C7C7B7B7B7B7A7A7AF1
S113F1607A7A797979797978787878787777777716
S113F1707777676767676757575757574747474743 9
S113F180737373737372727272717171717170705F
S113F1907070706F6F6F6F6F6E6E6E6E6E6D6D6D83
S113F1A06D6D6C6C6C6C6C6B6B6B6B6A6A6A6AA6
S113F1B0696969696968686868686767676767 66CD
S113F1C0666666666656565656564646464646363F0
S113F1D0636363626262626261616161606060 6014
S113F1E0605F5F5F5F5F5E5E5E5E5E5D5D5D5D39
S113F1F05C5C5C5C5B5B5B5B5B5A5A5A5A6452

FIG. 6E

```
S113F200648D8D8C8C8B8B8B8A8A8989888887877F
S113F2108686868585848483838282818180808OBA
S113F2207F7F7E7E7D7D7C7C7B7B7A7A7A79797820
S113F230787777767675757474747373727271 7186
S113F24070706F6F6E6E6E6D6D6C6C6B6B6A6A69ED
S113F2506968686867676666656564646363626253
S113F26062616160605F5F5E5E5D5D5C5C5C5B5BB8
S113F2705A5A5959585857575756565555545 4531E
S113F2805352525151515050 4F4F4E4E4D4D4C4C84
S113F2904B4B4B4A4A494948484747464645 4545EA
S113F2A0444443434242414140403F3F3F3E3E3D50
S113F2B03D3C3C3B3B3A3A393939383837373636B6
S113F2C0353534343333333232313130302F2F2E1D
S113F2D02E2D2D2D2C2C2B2B2A2A29292828282782
S113F2E027262625252424232322222221212020E7
S113F2F01F1F1E1E1D1D1C1C1C1B1B1B1B1B64FC
S113F300640A0B0B0C0C0D0D0E0E0E0F0F101011CA
S113F31011111212131314141515151616171718A4
S113F320181819191A1A1B1B1B1C1C1D1D1E1E1F25
S113F3301F1F20202121222222232324242525 26A5
S113F340262627272828292929 2A2A2B2B2C2C2C26
S113F3502D2D2E2E2F2F303030313132323333 33A6
S113F36034343535363637373738383939 3A3A3A26
S113F3703B3B3C3C3D3D3D3E3E3F3F40404141 41A7
S113F38042424343444444454546464747474 84828
S113F39049494A4A4B4B4B4C4C4D4D4E4E4E4F4FA8
S113F3A050505151525252535354545555555 65628
S113F3B0575758585859595A5A5B5B5C5C5C5D5DA9
S113F3C05E5E5F5F5F60606161626263636364 6429
S113F3D0656566666667676868696969 6A6A6B6BAA
S113F3E06C6C6D6D6D6E6E6F6F707070717172722A
S113F3F07373747474757576767777777878 7964BF
S113F400640A0B0C0D0E0F101112131415161718 95
S113F410191A1B1C1D1E1F202122232425262728E0
S113F420292A2B2C2D2E2F303132333435363738D0
S113F430393A3B3B3C3D3E3F404142434445464 7CD
S113F44048494A4B4C4D4E4F505152535455565 7C0
S113F45058595A5B5C5D5E5F606162636465666 7B0
S113F46068696A6B6C6D6E6E6F707172737475 76A9
S113F4707778797A7B7C7D7E7F808182838485 86A0
S113F4808788898A8B8C8D8E8F909192939495 9690
S113F4909798999A9B9C9D9E9FA0A0A1A2A3A4A586
```

FIG. 6F

S113F4A0A6A7A8A9AAABACADAEAFB0B1B2B3B4B580
S113F4B0B6B7B8B9BABBBCBDBEBFC0C1C2C3C4C570
S113F4C0C6C7C8C9CACBCCCDCECFD0D1D2D2D3D463
S113F4D0D5D6D7D8D9DADBDCDDDEDFE0E1E2E3E460
S113F4E0E5E6E7E8E9EAEBECEDEEEFF0F1F2F3F450
S113F4F0F5F6F7F8F9FAFBFCFDFEFFFFFFFFFFFF64EA
S113F500D2FFFFFFFFFFFFFFFFFFFFFFFFFFFFFFF34
S113F510FCF9F6F4F1EEEBE8E6E4E1DFDCDAD8D668
S113F520D4D2D1CFCDCBCAC8C6C5C3C2C1C0BEBD5B
S113F530BCBAB9B8B6B5B3B2B2B1B0AFAEADACAB9C
S113F540AAA9A8A7A5A4A3A2A1A1A09F9E9E9D9C91
S113F5509B9B9A999897979695949392919190 8F53
S113F5608E8E8D8D8C8B8B8A8A8988888787868685FA
S113F570848383828180807F7E7D7D7C7C7B7B7A9B
S113F5807A797978777776767574747372727170 24
S113F590706F6E6D6D6C6B6B6A6A696968686766BB
S113F5A06665656464636362616160 5F5F5E5D5C5B49
S113F5B05B5A595958575756565555454535252 51E9
S113F5C050504F4E4D4C4B4A4948474746454544 99
S113F5D043424241403F3E3D3C3B3A383735353467
S113F5E0333231302F2D2C2A2927252322201F1D89
S113F5F01B191613110E0C080400000000000000D2A1
S113F600644E4E4E4E4E4E4E4E4E4E4E4E4E4E4E00
S113F6104E4E4F4F4F505050515151525252535 3DE
S113F6205353535454545455555555555565656568C
S113F63056575757575758585858585858595959 4A
S113F6405959595A5A5A5A5A5A5A5B5B5B5B5B5B13
S113F6505B5B5C5C5C5C5C5C5C5C5D5D5D5D5D5DE2
S113F6605D5D5E5E5E5E5E5E5E5E5E5F5F5F5F5FB3
S113F6705F5F5F606060606060606061616161 6184
S113F680616161616161626262626262626263635A
S113F6906363636363636464646464646464646652A
S113F6A065656565656565666666666666666767FB
S113F6B06767676767676868686868686868696969C8
S113F6C06969696A6A6A6A6A6B6B6B6B6B6B6C6C8F
S113F6D06C6C6C6C6D6D6D6D6E6E6E6E6F6F6F6F4E
S113F6E07070707070717171727273737474747575F3
S113F6F07676777878797A7B7C7D7D7D7D7D7D6477
S113E0002728292C2C2C2D2D2F2F333332323232 2A
S113E010343737393C3D3D413B3C3C414246464622
S113E0203D3F41414446484B4148484A4A4B4B4D89
S113E030464A4A4B4B4D4D4E4B4D4F525252525500

FIG. 6G

S113E040642823FA96968C877D78716C6664143202
S113E05069965A030264C810010F9B04010A001E4A
S113E060FF0C05DC050A0F141C242C34141E283262
S113E0703C4B5A64717000140DB91A64000000001E
S113E0800014283C5064788CAAC80514284D142028
S113E090202A2A2056322E3020456D62656464653C
S113E0A06420436F6465206279204226647202A2A2F
S113FB0002C0038402D003D14FC7FFFF6E011E6EF3
S113FB10011F4502409445FB00AD22A600B705A68F
S113FB2070B73EA604B73C0F3CFDB63DA1052529A0
S113FB30C6FAFEA1FF272220C487898A8819361BAA
S113FB40367E367E3A7E387E391E371A360D37FDBC
S113FB501836810F16FDB7188145FAC37E407E41E1
S113FB607E427E437E447E457E464500409486A187
S113FB70FF2602A612B74086A1FF2602A601B71FE0
S113FB8086A1FF2602A601B71E888A65FFFF260804
S113FB90A60087A68087A702888A65FFFF2606A697
S113FBA00087A6FB879BC7FFFF4501ED9445FB003B
S113FBB0AD8B4E40196E40136E0C1445FD88AD3864
S113FBC0CDFC6AA10D27F4AD8AA4DFA1582611C685
S113FBD0FAFEA1FF2703CCFAFD45FDE0AD1A20DBB8
S113FBE0A1572618AD7645FDB4AD0D20CE87898A80
S113FBF08820050F16FD7E187D26F881A150264A1F
S113FC00AD0220B745004FD6FD38D701EC5BF8456F
S113FC10FDBFADE4953541A7DCAD58262586A1305E
S113FC20270BA139270BA1312618CD01F8A72320D2
S113FC30E3A7230B16B0AD320B16ABAD2D45FDB4C7
S113FC402005A72445FDCEADAF81A1552670458082
S113FC5000354345FB003545AD0220A845003BD6A1
S113FC60FD08D701EC5BF8CC01EDC7FFFF0B16FADA
S113FC70B61881A7FE9E6F06ADF0A10D2602A60A56
S113FC80A15326F4ADE4A13027EEA1392704A13114
S113FC9026E69EE705AD3B26229EE7019EE702A0ED
S113FCA0039EE70695AF06AD292610F79EEB029E4C
S113FCB0E702AF019E6B01EF9E6C02A70281A1488F
S113FCC02704A11F260645FD90CCFBE945FDD7CCB2
S113FCD0FBE9AD96AD202614AD136287CDFC6AAD69
S113FCE0152607AD089EEB01A500A70181A030A150
S113FCF0092302A00781A130250EA1392308A141BF
S113FD002506A1462202A5008155452023A602C747
S113FD10FE08C6FF7EF7A601AD1FA60AC7FE08A609
S113FD2064AD16A608C7FE08A601AD0D4FC7FE08B0

FIG. 6H

S113FD30AFC0AFC0754322D58187A6164BFE9E6B1C
S113FD4001F88681953541A70286B7408A887543B4
S113FD50252D75452429A601C7FE08C6FF7EF7A6F2
S113FD6001ADD6A609C7FE08A601ADCD86F7A60348
S113FD70ADC7A608C7FE08A601ADBE4FC7FE08AFB3
S113FD80013B40CA554194810D0A426F6F743E0095
S113FD902020285029726F6772616D2028572969C5
S113FDA0706520285529706772616465206528583C
S113FDB029697400202020436F6D706C6574650020A0
S113FDC02D2077616974696E67202E2E2E00202DF8
S113FDD0206572726F7200202D20776861743F0075
S113FDE0202D2052657365742056656374 6F7220EC
S10BFDF0496E76616C69640040
S105FFDCFACA5B
S105FFDEFACD56
S105FFE0FAD051
S105FFE2FAD34C
S105FFE4FAD647
S105FFE6FAD942
S105FFE8FADC3D
S105FFEAFADF38
S105FFECFAE233
S105FFEEFAE52E
S105FFF0FAE829
S105FFF2FAEB24
S105FFF4FAEE1F
S105FFF6FAF11A
S105FFF8FAF415
S105FFFAFAF710
S105FFFCFAFA0B
S105FFFEFB08FA
S104FF7EF688
S9030000FC

SIMPLE ENGINE FUEL CONTROLLER

This is a continuation of application Ser. No. 10/375,458 filed Feb. 27, 2003,now U.S. Pat. No. 7,313,474 which claims the benefit of Provisional Application No. 60/362,475 filed Mar. 7, 2002. The entire disclosure of the prior application, application number 10/375,458 is hereby incorporated by reference.

BACKGROUND OF THE INVENTION

During the early to mid-1980s, car manufacturers, under pressure to increase fuel economy and simultaneously reduce emissions, switched to electronic fuel injection to obtain more precise control of engine fuel under all operating conditions. When the automotive aftermarket saw the trend, it entered the field, first with PROM chips that allowed the buyer to modify the constants programmed into the electronic controller unit at the factory by simply switching chips. This allowed one to increase performance somewhat, generally at the expense of gas mileage, and to make engine modifications for which changes in program parameters were needed. Gradually, conversion kits were developed to allow hobbyists and racers to upgrade carbureted engines to Electronic Fuel Injection (EFI) or to replace OEM Electronic Control Units (ECUs) to obtain much more control over the system than the re-programmed PROM chips allowed. One of the first of these was U.S. Pat. No. 4,494,509 (1985) to Long. Although now plentiful, these kits are quite costly and difficult to install and configure. Numerous drivability problems whose solutions are beyond the capabilities of the users are also often reported after the installation. Furthermore, the price of these systems places them well beyond the reach of most hobbyists and enthusiasts.

The present invention provides an engine controller that is: more cost effective because of its low parts count due to integrated technology; simpler to install because of its generic design and flexible software, allowing it to be used with all models and makes of engines from motorcycles to trucks, even or odd number of cylinders, and regardless of the experience of the end user. The design is also more reliable because of several software algorithms that will be described.

OBJECTS AND SUMMARY OF THE INVENTION

A general object of an embodiment of the present invention is to provide a simple, reliable, user configurable system (electronic circuit and software) for electronic fuel injection control.

An object of an embodiment of the present invention is to provide an aftermarket EFI system that can be manufactured at low cost.

Another object of an embodiment of the present invention is to provide a generic EFI system that can be used with a large variety of engines of different sizes, numbers of cylinders, types and sizes of fuel injectors, and types of ignition systems.

A further object of an embodiment of the present invention is to provide an EFI system that can be easily installed by hobbyists and non-professional users with only a limited knowledge of electronics, computers, and the principles of electronic fuel control.

Another object of an embodiment of the present invention is to provide an EFI system with reduced susceptibility to electronic noise.

Briefly, and in accordance with at least one of the foregoing objects, an embodiment of the invention provides an integrated microprocessor based electronic circuit and software that uses an external tachometer signal and various sensor inputs to calculate combustion engine fuel requirements, and provides corresponding electronic control signals to open and close the engine mounted fuel injectors. Parameters for the calculation of these signals are user configurable.

BRIEF DESCRIPTION OF THE DRAWINGS

The present invention may best be described with reference to the accompanying drawings in which:

FIGS. 6A to 6G provide a software assembler listing for the ECU in the form of s-records that can be downloaded to a suitable micro controller.

DETAILED DESCRIPTION OF THE INVENTION

Figure 1:
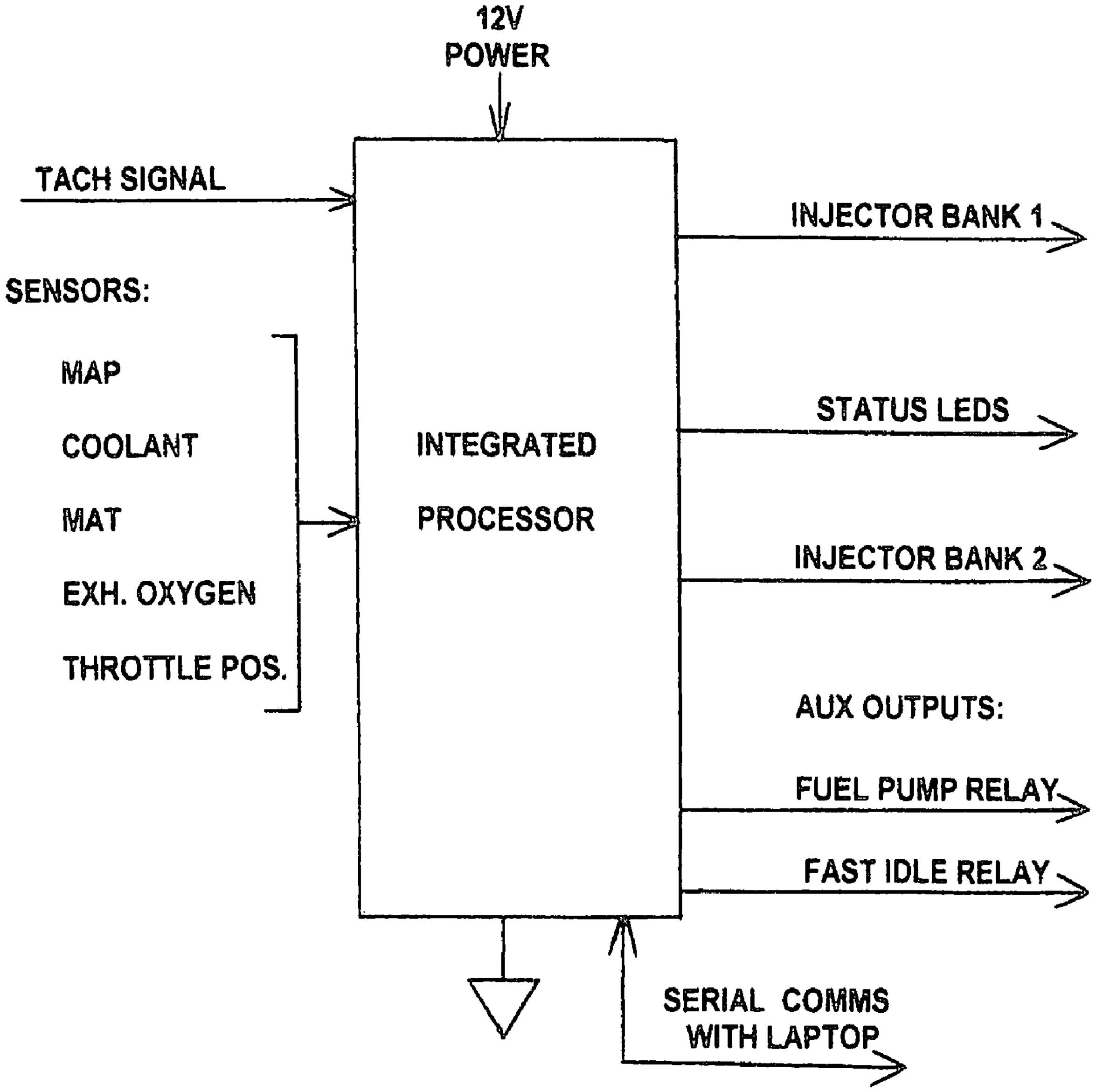
FIG. 1 is a block diagram providing an overview of the system.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as described herein.

1. Circuit Description

Figure 2:
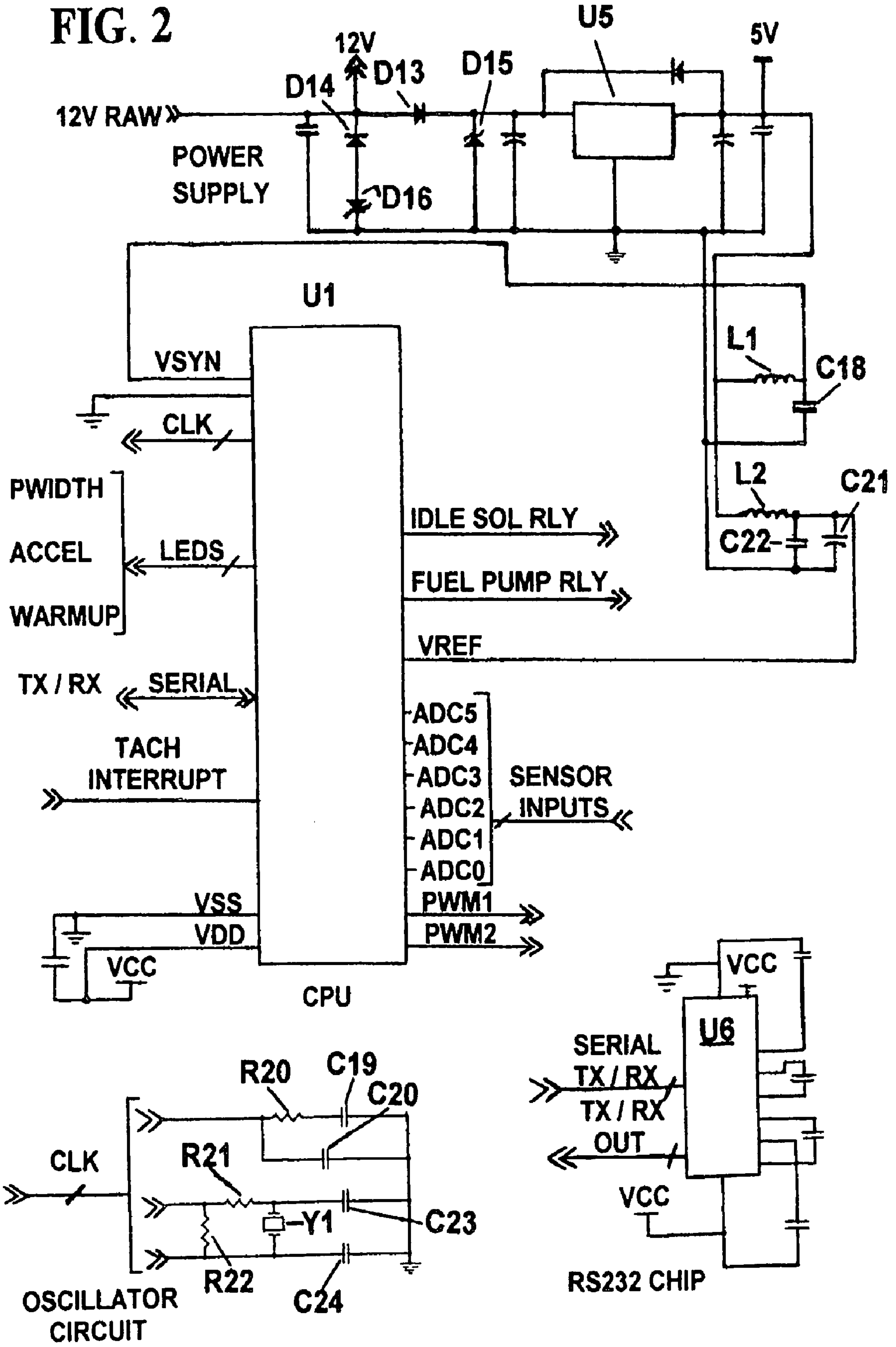
FIG. 2 shows specifics of the integrated microprocessor and its regulated power supply.

The overall hardware system is shown in FIG. 1 and is detailed in the following figures. We start the circuit description with the power supply (U5 in FIG. 2). This is an automotive grade linear 5-volt regulator that can, by itself, handle reverse and over-voltages. To this has been added the combination of diodes D14 and D16, which clamp reverse voltage spikes to −12 volts. D13 only permits positive polarity voltage to pass to D15, which clamps this voltage to 22 volts eliminating the over-voltage effects of switched loads. The total combination provides an extremely robust power supply. Also, there are two power supply filter circuits—one consists of capacitor C18 and inductor L1, providing power to the internal Phase Lock Loop (PLL) clock, and L2, C21, and C22, which filter the analog power supply for the analog-to-digital converter.

The CPU of choice for this application is the Motorola MC68HC908GP32 (U1). This CPU is a member of Motorola's HCO8 family of micro controllers, providing a rich integration of features, and hence allows a low system parts count. The CPU core runs at an internal bus speed of 8 MHz, which is derived from an internal phase-locked loop clocked from a 32.768 KHz crystal (Y1). The GP32 version has 32 Kbytes of on-chip flash ROM memory with direct in-circuit programming, which allows for the storage and runtime re-programming of constants that is extremely desirable in this application. There are 512 bytes of on-chip RAM memory—more than adequate for this application. Other features include two 16-bit, 2-channel timers, serial communication channels, and an 8-channel, 8-bit Analog to Digital Converter (ADC) for measuring sensor inputs.

The CPU oscillator circuit is comprised of a 32.768 watch crystal (Y1), two capacitors (C23 and C24), and two resistors (R21 and R22). The on-chip PLL clock circuit requires the external loop filter network C19, C20, and R20. The microprocessor has an internal power-on reset circuit, so no external circuitry is required.

Tuning of system configuration parameters while the engine is running is key to a successful injector control unit. This system uses a standard RS-232 communication interface chip (U6) to talk to a host PC, which is running a custom application that allows the download and tuning of the relevant parameters.

Figure 3:
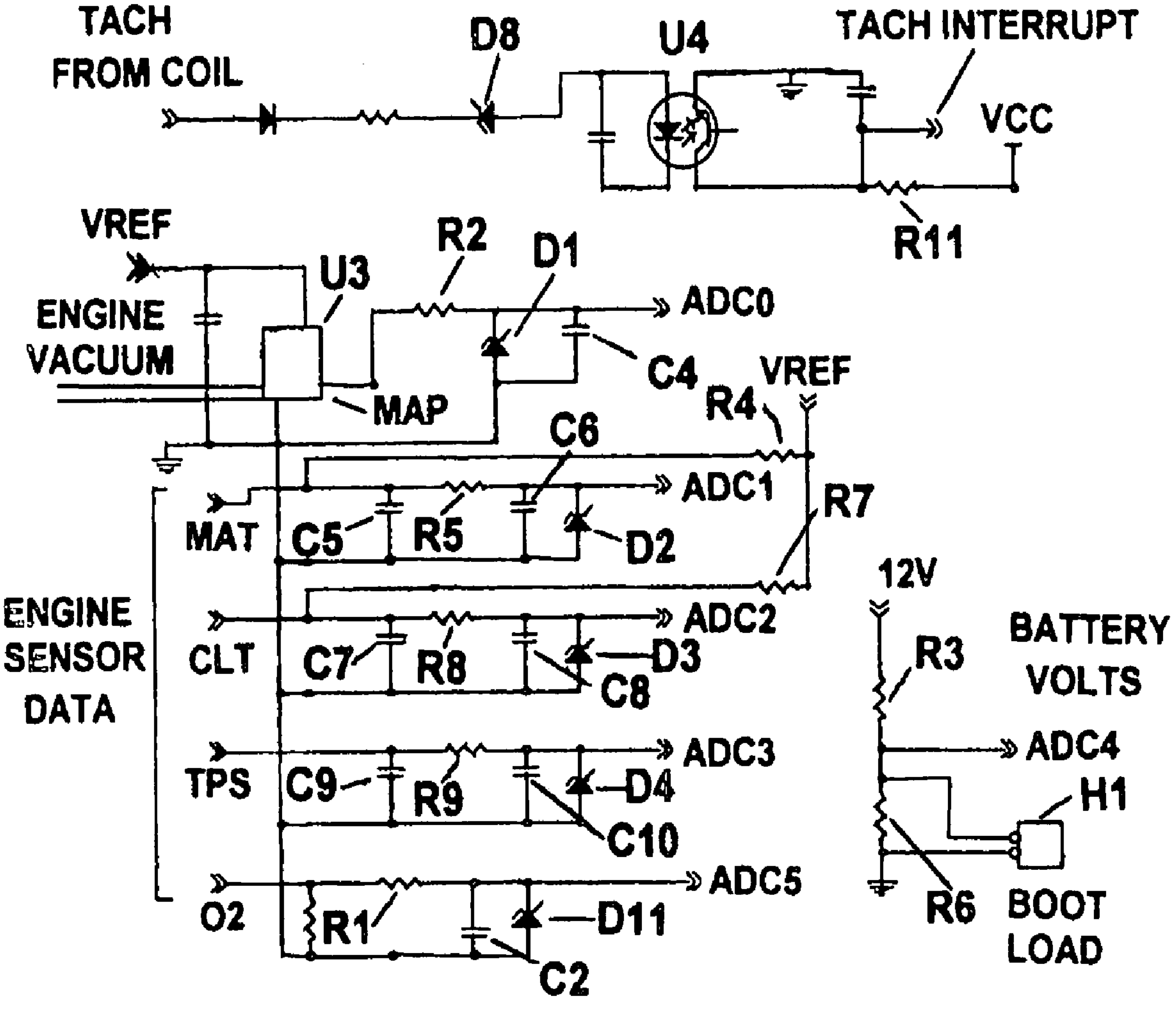
FIG. 3 provides circuit diagrams of the conditioning and filtering of the sensor inputs.

The sensor inputs to the system are shown in FIG. 3. The driving input for the system is the tachometer or timing signal, which is generally taken from the ignition circuit (ignition coil primary circuit or tachometer drive). This signal is clipped to +5V by Zener diode D8, and applied to a 4N25 opto isolator (U4) providing immunity to damage from over-voltage. The phototransistor in the opto isolator is biased by R11 and fed into the interrupt pin IRQ1 of the micro controller. By timing the interrupts and knowing that each one represents a cylinder firing, the RPM can be calculated by the micro controller. Furthermore, to significantly reduce the probability of a false tach trigger, a software time-adaptive filter is used on the interrupt such that it is only re-enabled for future triggers after some point in the RPM period is reached, for example the V2 way point.

The other critical input to the system comes from the manifold absolute pressure (MAP) sensor (U3) that monitors intake manifold vacuum. The sensor used here is the Motorola MPX4250 which is an integrated pressure sensor containing the sensing element, coupled to the engine manifold by a flexible tube, and an amplifier and temperature compensation circuitry all in one package, yielding an analog output which is proportional to applied pressure (absolute, not gauge). The output of the MAP sensor is filtered by R2 and C4, clamped by diode D1, and is supplied to channel 0 of the ADC in the micro controller. Using this sensor allows the system to handle normally aspirated and turbo engines to 2.5 Bar. Also, the MAP sensor ADC is sampled in the CPU at a fixed time after receipt of the tach signal; doing this eliminates fluctuation of the pressure due to piston motion during the engine cycle, and hence provides a consistent fuel mixture and a smoother running engine.

This fuel injection system is of the "speed-density" variety, meaning that the amount of air consumed (and required fuel) is deduced from the manifold absolute pressure and the RPM at which the engine is operating. Hence, with just these inputs, the engine can be run; the other inputs that follow provide more optimal control under different load and environmental conditions.

Engine temperature measurements are sensed by negative-coefficient thermistors mounted in the intake air stream (MAT) and engine coolant liquid (CLT). In order to sense the resistance of the sensors, they are configured as part of a voltage divider circuit—R4 for the MAT sensor and R7 for the CLT sensor. One side of each sensor is tied to ground. The resultant divider voltage is filtered by R5 and C5, C6 for the MAT sensor and R8 and C8, C7 for the CLT sensor, and protected from over-voltage by D2 and D3.

Real-time sensing of throttle position is required by the CPU in order to provide more fuel during periods of rapid throttle opening. The standard throttle position sensor (TPS) is a simple 10K potentiometer attached to the engine throttle shaft with a constant voltage (5 volts in this case) across the potentiometer. The wiper terminal of the pot will therefore provide a variable voltage between 0 to 5 volts. This voltage is filtered by C10 and R9 and clamped by diode D4, and then applied to ADC channel 3.

Other input sensors include battery voltage (needed to adjust the injector opening time), derived by the resistor divider consisting of R3 and R6, and the exhaust gas oxygen content sensor (02). The 02 sensor is a special device that generates a small voltage (approx. 0.6 volts) when the ratio of gas to air is less than 14.7. Once again, the common theme of filtering (R1 and C2) and limiting (D11) is utilized.

The boot loader header (H1) allows a user to pull the battery voltage terminal (AD4) on the CPU down to ground. This is sensed in the CPU software and is recognized as the signal to cease normal operation and load new software in the CPU ROM memory using the RS232 port.

Figure 4:
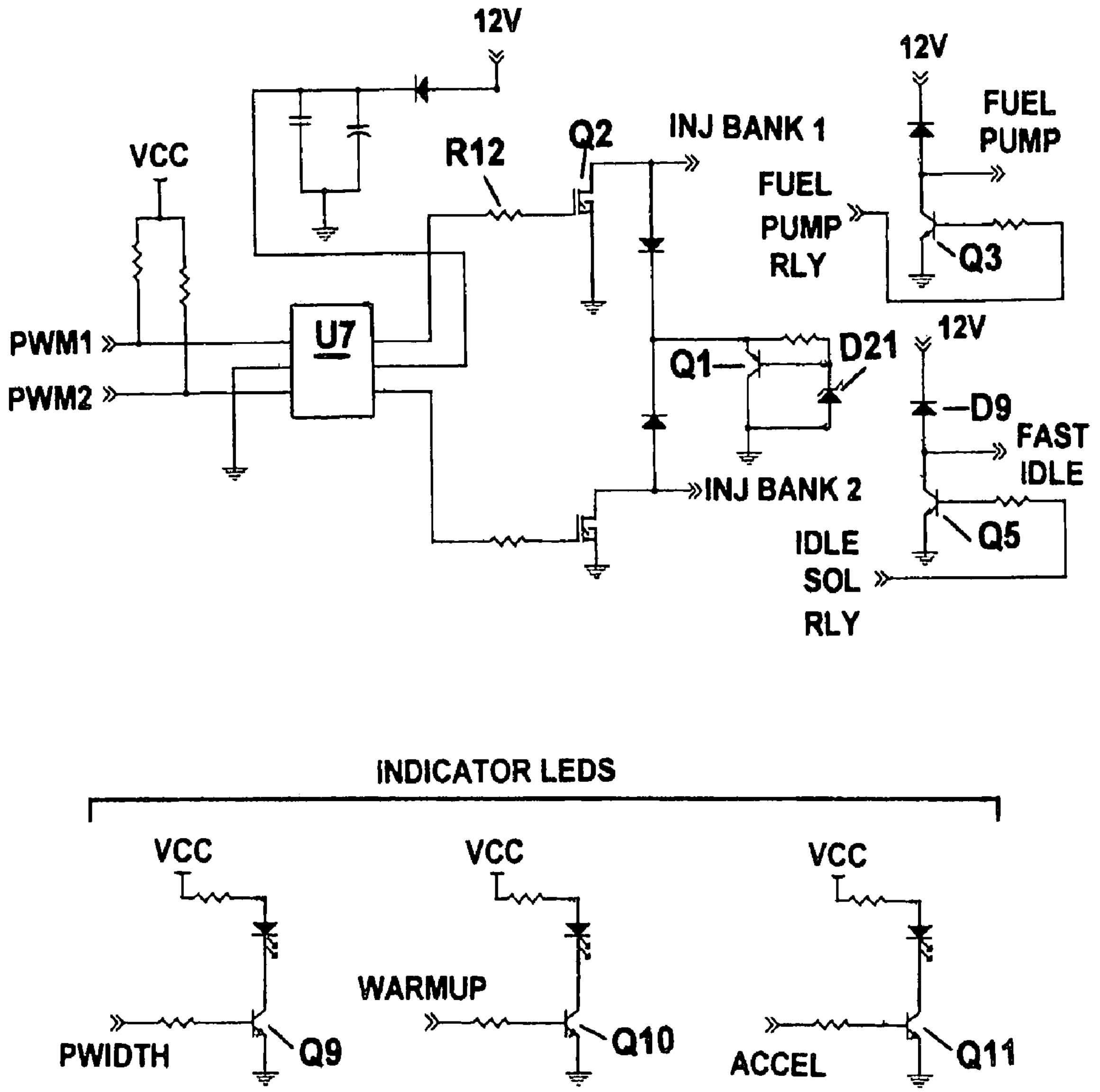
FIG. 4 provides circuit diagrams for the fuel injector drivers, auxiliary outputs, and status LED lights.

FIG. 4 is the schematic for the various output drivers for fuel injectors and relays. Starting with the fuel injectors, there are two separate but identical fuel injector drivers (only the first of them will be described). A timer output compare/PWM channel in the CPU is fed into one of the two input channels of the transistor driver chip (U7), which provides fast gate drive (via R12) to the Field Effect Transistor (FET) Q2. This is important because the injector needs to be opened as rapidly as possible if fuel metering is to be precise. The fuel injectors are pulled low by Q2, and over-voltage and inductive kickback from them are handled by the combination of Zener diode D21 and the Darlington transistor (Q1). The two FET injector drivers may be connected to two banks of as many injectors as the drivers can handle. This must be determined by the injector current requirements, but 4 injectors per bank is easily achievable. The user can specify through the configuration software how often to fire each bank of injectors relative to the tach input, and whether to fire them sequentially, so that each injector fires once every engine cylinder cycle of two crank revolutions, or simultaneously, such that each injector fires every crank revolution. This allows the system to be used with throttle body injectors (one or two central injectors) or multiport (one injector per cylinder).

To be truly generic it is required that the system handle the two common electrical impedances for fuel injectors: high impedance (roughly 12-16 ohms) and low impedance (1.2 to 2.5 ohms). The high impedance type (also known as saturated) provides its own current limiting, due to its comparably high resistance, and can be driven directly by Q2. The low-impedance types, known as peak-and-hold injectors, require a different drive strategy. These injectors like to have higher "peak" current applied, say 4 amps, while they are opening, and a lower "hold" current (like 1 amp or so) to keep them open. To provide this relative current control, Q2 is driven fully on during the time the injector is opening. When a predetermined time has elapsed which is sufficient to ensure that the injector is open (based on injector impedance and supply voltage), the drive to Q2 is switched to a pulse-width modulation mode (using the PWM mode of the timer channel), with a frequency of 15 KHz and a duty cycle which keeps the average current through the injector at the desired "hold" value. Both the duration of the "peak" current and the amount of reduction in amplitude during the "hold" portion are configurable by the user in the software.

Direct control of a fast-idle solenoid is provided by Q5 (spikes limited by D9), which is opened when the engine is first started and not at a fully warmed temperature. The fast idle solenoid provides an air bypass around the throttle plates to provide additional air in the intake manifold. The operation of the electric fuel pump is also controlled in the micro controller (via a relay) using Q3.

Finally, three LED lights are switched by transistors Q9-Q11. The first tells the user that the injectors are being driven, the other two tell the user when extra fuel enrichment is being supplied to compensate for cold engine warm up, and for acceleration, as indicated by a large throttle opening rate.

2. Software Description

Figure 5A:
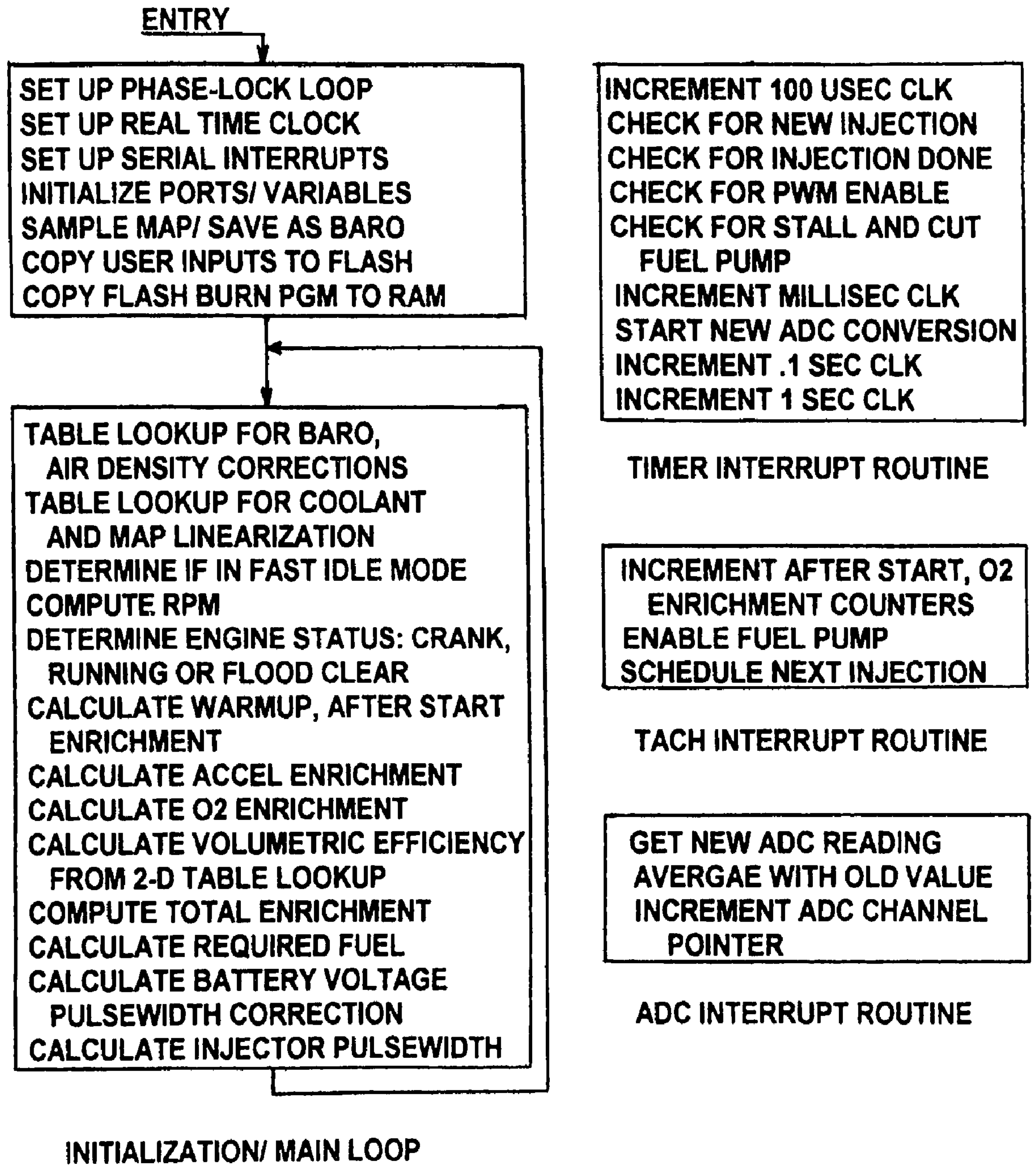
FIG. 5 provides a block diagram of the software logic.

A summary of the software flow is provided in FIG. 5, and a complete listing of the embedded code is provided in FIG. 6 in the form of s-records which can be downloaded into Motorola HC08 series micro controllers through a serial port with commercially available software for this purpose installed on a host computer. As can be seen from the flow-chart, the main loop of the program performs calculations on a continuing basis, as long as there are no interrupts. The latter, shown in the right column of FIG. 5, are used for time critical operations and for a 100 microsecond clock.

The primary control algorithm, performed in the main loop of the embedded program, is the calculation of injector on time or pulse width. For this simple fuel injection system, the equations used for this have been optimized as follows:

air_density=0.3916*MAP/(MAT+459.7)

mass_air=air_density cylinder_volume mass fuel=mass air/*AFR*

Inj_*PW*=mass_fuel/Inj_Flow_Rate

The injector flow rate is a constant measured at the factory by flowing the injector at the line pressure specified for the car. The fuel required in the above equation depends on the amount (in mass) of air entering the engine and the desired air/fuel ratio (AFR). In the above, air density is in pounds per cubic foot, MAP in kiloPascals, MAT is the intake manifold air temperature in degrees Fahrenheit, and the 459.7 converts to degrees Kelvin. The volume of the cylinder is in cubic feet.

To simplify the calculations required by the microprocessor, one can define a quantity at a specific set of input values. In this system, we define the variable Req_fuel which is the amount of injector open time required for a MAP value of 100 Kpa (essentially wide-open throttle), MAT value of 70 degrees F., and assign values for AFR and cylinder volume which relate to the application. Req_fuel is a constant inside of the program. With this definition, the code is simplified by the use of direct units for the calculations, for example, MAP readings in Kpa/100 can be directly multiplied by Req_fuel to yield the change in pulse width time. Also, quantities, like volumetric efficiency (VE), which is the efficiency of the engine in pumping air at a specific RPM and load, can also be directly multiplied to the Req_fuel value. Likewise, acceleration and warm up enrichment values are directly multiplied in normalized percentages, as well as feedback settings for closed loop operation (02). Lookup tables for percent changes from the defined baseline value for Req_fuel is also used for temperature correction and barometric pressure correction, and are multiplied in a similar manner. This approach is very intuitive for users and yields:

Inj_PW=Req_fuer(MAP/100)*(*VE*/100)*(02/100)*(Warm/100)*(Accel/100)*(Baro/100)*(Air/100).

The preceding description covers the basic requirements, but there are several other corrections that need to be made. The first of these is enrichment for a cold start. During the cranking period and for at least a minute or more thereafter, an extremely rich fuel mixture is required for the engine to fire and run properly. How rich depends on the coolant temperature as measured by the coolant sensor. Hence, a user-configurable table is provided in flash memory for fuel enrichment vs temperature, and this is factored into the injector pulse width equation. As the engine warms up, the enrichment tapers off.

During the cranking phase, more sophisticated strategies employ asynchronous injection, in which the injector is made to pulse several short bursts of fuel rather than a single long shot. This produces better mixing of the fuel and air. This is needed during cranking, because there is very little engine vacuum generated at the slow cranking speeds. Hence, the air moves very slowly through the intake tract and does not mix well with the fuel, thereby producing a weaker and rougher combustion event.

A second area requiring special enrichment is acceleration. When the throttle is depressed rapidly for acceleration, a very rich mixture is required for a short period to keep the engine, from stumbling. To do this the ECU must first sense that acceleration is occurring. It does this by polling for a TPS and/or MAP sensor rate of change that is above a fixed threshold. When this occurs, the mixture is enriched by an amount, and for a time period, which is a function of the rate of change.

Another fuel correction commonly used is for barometric pressure. This affects the airflow and air density, and hence the fuel must be corrected to maintain a desired AFR. In the present system the intake MAP reading just before starting the engine is used as the barometric pressure, and a correction table is applied.

A stoichiometric air/fuel ratio of 14.7 is generally considered optimal for all around driving, economy and emissions, and this is what is strived for in closed loop mode using oxygen sensor feedback. This sensor, as the name implies, sends back to the ECU a voltage proportional to the amount of free oxygen in the exhaust. Too much means a lean mixture requiring more fuel be added; too little, just the opposite. Thus, in closed loop mode a PID loop is used to modify the basic fuel equation so as to maintain a just right fuel mix regardless of the type of gas used or the amount of wear in the engine. This mode is used off idle during cruise conditions when such a stoichiometric mixture is desired.

The fuel injector is a solenoid tied to battery voltage on one end, and is grounded by the ECU at the other end when it is desired to turn on the injector. Now the specification injector flow rate is for steady state conditions, but the injector in the engine is not run at steady state, it is constantly pulsed on and off, and requires about 1-2 ms to fully open, and 1 ms to fully close. (During opening it is fighting spring pressure, while the spring assists in closing.) This fact requires two more corrections for fuel regulation. One is for the fact that the flow rate is not constant during the open/close ramps, and the other is a compensation for battery voltage, which has an effect on the open time. If the battery is weak, the injector will take longer to open. Hence, battery voltage is measured as shown in FIG. 3, and the injector open time is modified either linearly or from a table according to the deviation of battery voltage from 12 volts.

A practical feature of the software not directly related to engine control is the provision for a bootloader program. This feature allows corrections and upgrades to the software to be easily downloaded by the users when they are developed.

What is claimed is:

1. A system for controlling an engine, comprising:

a controller;

a tachometer configured to provide pulses to the controller;

a sensor configured to measure operating parameters and output a corresponding signal to the controller;

a memory configured to store data for calculating engine fuel requirements; and a drive circuit, wherein the controller controls an on-time and an off-time of a fuel injector using modulation of currents capable of opening and closing the fuel injector, wherein within the fUel injector on-time, the controller provides a current capable of opening the fUel injector for a first time period within the on-time and a modulated current capable of maintaining the fuel injector in an open state for a second time period, wherein the second time period comprises a remaining portion of the on-time, wherein the drive circuit controls peak current duration to open the fuel injector and reduces holding current to maintain the fuel injector in an open state, and wherein the controller controls the drive circuit according to the data and based on the signal from the sensor.

2. A system for controlling an engine, comprising:

a controller;

a sensor configured to measure an operating parameter of the engine and output a corresponding parameter signal to the controller;

wherein the controller selectively controls a first fuel injector based on the parameter signal from the sensor, wherein, when the controller controls the first friel injector to move from a closed position to an open position, the controller provides for a first time period a first current having a first value which is capable of moving the first fuel injector from the closed position to the open position, and provides a second current, which is a modulated current, having a second value which is capable of maintaining the first fuel injector in the open position for a second time period, and wherein the first value is different than the second value.

3. The system as claimed in claim 2, wherein the sensor comprises:

a speed indicator configured to sense engine speed and output the parameter signal, which comprises a speed signal, to the controller.

4. The system as claimed in claim 3, wherein the speed indicator comprises a tachometer.

5. The system as claimed in claim 3, wherein the speed signal comprises a timing signal that indicates the engine speed.

6. The system as claimed in claim 2, wherein the parameter signal comprises a digital signal.

7. The system as claimed in claim 2, wherein the parameter signal comprises an analog signal.

8. The system as claimed in claim 2, wherein the sensor comprises a pressure sensor, and wherein the parameter signal comprises a pressure signal.

9. The system as claimed in claim 8, wherein the pressure sensor comprises a manifold absolute pressure sensor, and wherein the pressure signal represents a manifold absolute pressure.

10. The system as claimed in claim 8, wherein the pressure sensor comprises a barometric pressure sensor, and wherein the pressure signal represents a barometric pressure.

11. The system as claimed in claim 2, wherein the sensor comprises an engine temperature sensor, and wherein the parameter signal comprises a temperature signal that represents a temperature of the engine.

12. The system as claimed in claim 11, wherein the engine temperature sensor comprises an engine coolant temperature sensor, and wherein the temperature signal represents a temperature of engine coolant.

13. The system as claimed in claim 11, wherein the engine temperature sensor comprises an manifold intake air temperature sensor, and wherein the temperature signal represents a temperature of manifold intake air.

14. The system as claimed in claim 2, wherein the sensor comprises a throttle position sensor, and wherein the parameter signal comprises a throttle position signal that represents a position of an engine throttle.

15. The system as claimed in claim 2, wherein the sensor comprises an oxygen sensor, and wherein the parameter signal comprises an oxygen signal that represents an amount of residual oxygen in the engine exhaust.

16. The system as claimed in claim 2, wherein the sensor comprises a battery voltage sensor, and wherein the parameter signal comprises a battery voltage signal that represents a battery voltage.

17. The system as claimed in claim 2, wherein the second value is less than the first value.

18. The system as claimed in claim 2, wherein the first current is an unmodulated current.

19. The system as claimed in claim 2, wherein the modulated current fluctuates between a maximum current value and a minimum current value, and wherein the second value is a value between the maximum current value and the minimum current value.

20. The system as claimed in claim 2, wherein the second value is a lowest current value that is capable of maintaining the first fuel injector in the open position.

21. The system as claimed in claim 19, wherein the second value is a lowest current value that is capable of maintaining the first fuel injector in the open position.

22. The system as claimed in claim 2, wherein the controller selectively controls the first fuel injector by at least determining the first value of the first current based on the parameter signal from the sensor.

23. The system as claimed in claim 22, wherein the sensor comprises a battery voltage sensor, and wherein the parameter signal comprises a battery voltage signal that represents a battery voltage.

24. The system as claimed in claim 2, wherein the controller selectively controls the first fUel injector by at least determining the second value of the second current based on the parameter signal from the sensor.

25. The system as claimed in claim 24, wherein the sensor comprises a battery voltage sensor, and wherein the parameter signal comprises a battery voltage signal that represents a battery voltage.

26. The system as claimed in claim 2, wherein the controller selectively controls the first fUel injector by at least determining the first time period based on the parameter signal from the sensor.

27. The system as claimed in claim 26, wherein the sensor comprises a battery voltage sensor, and wherein the parameter signal comprises a battery voltage signal that represents a battery voltage.

28. The system as claimed in claim 2, wherein the controller selectively controls the first fuel injector by at least determining the second time period based on the parameter signal from the sensor.

29. The system as claimed in claim 28, wherein the sensor comprises a battery voltage sensor, and wherein the parameter signal comprises a battery voltage signal that represents a battery voltage.

30. The system as claimed in claim 28, wherein the sensor comprises:

a speed indicator configured to sense engine speed and output the parameter signal, which comprises a speed signal, to the controller.

31. The system as claimed in claim 30, wherein the speed indicator comprises a tachometer.

32. The system as claimed in claim 30, wherein the speed signal comprises a timing signal that indicates the engine speed.

33. The system as claimed in claim 28, wherein the sensor comprises a pressure sensor, and wherein the parameter signal comprises a pressure signal.

34. The system as claimed in claim 33, wherein the pressure sensor comprises a manifold absolute pressure sensor, and wherein the pressure signal represents a manifold absolute pressure.

35. The system as claimed in claim 33, wherein the pressure sensor comprises a barometric pressure sensor, and wherein the pressure signal represents a barometric pressure.

36. The system as claimed in claim 28, wherein the sensor comprises an engine temperature sensor, and wherein the parameter signal comprises a temperature signal that represents a temperature of the engine.

37. The system as claimed in claim 36, wherein the engine temperature sensor comprises an engine coolant temperature sensor, and wherein the temperature signal represents a temperature of engine coolant.

38. The system as claimed in claim 36, wherein the engine temperature sensor comprises an manifold intake air temperature sensor, and wherein the temperature signal represents a temperature of manifold intake air.

39. The system as claimed in claim 28, wherein the sensor comprises a throttle position sensor, and wherein the parameter signal comprises a throttle position signal that represents a position of an engine throttle.

40. The system as claimed in claim 28, wherein the sensor comprises an oxygen sensor, and wherein the parameter signal comprises an oxygen signal that represents an amount of residual oxygen in the engine exhaust.

41. The system as claimed in claim 2, wherein the controller selectively controls the first fuel injector by at least determining a duty cycle of the modulated current based on the parameter signal from the sensor.

42. The system as claimed in claim 40, wherein the sensor comprises a battery voltage sensor, and wherein the parameter signal comprises a battery voltage signal that represents a battery voltage.

43. The system as claimed in claim 2, wherein the controller selectively controls a second fuel injector based on the parameter signal from the sensor to move the second fuel injector from a closed position to an open position, wherein a user can selectively configure the controller to operate in a first mode and a second mode, wherein, in the first mode, the controller moves the first frel injector from the closed position to the open position and simultaneously moves the second fUel injector from the closed position to the open position, and wherein, in the second mode, the controller moves the second fuel injector from the closed position to the open position at a time which is different from when the controller moves the first fuel injector from the closed position to the open position.

* * * * *